United States Patent
Ackermann et al.

[15] 3,693,593
[45] Sept. 26, 1972

[54] AUTOMATIC POULTRY FEEDING DEVICE

[72] Inventors: Harry John Ackermann, 332 S. Sycamore, Monticello, Iowa 52310; Louis Dewey Blessin, 2327 Dresden Ave., Rockford, Ill. 61103; Leroy Nicholas Hermann, R. R. # 1, Box 193A, Roscoe, Ill. 61073; Max Henry Ririe, 1635 T Street, Gering, Nebr. 69341; Everett John Swinbank, 10524 Ventura Blvd., Loves Park, Ill. 61111

[22] Filed: May 7, 1971

[21] Appl. No.: 141,144

[52] U.S. Cl. ............................119/52 AF, 119/56
[51] Int. Cl. .......................A01k 05/02, A01k 39/00
[58] Field of Search.................119/52 AF, 56, 51.11

[56] References Cited

UNITED STATES PATENTS 2,800,106  7/1957  Nelson.....................119/52 AF

Primary Examiner—Hugh R. Chamblee
Attorney—Kane, Dalsimer, Kane, Sullivan & Kurucz

[57] ABSTRACT

A poultry feeding device comprising an overhead trolley system, motor means for driving said system, a plurality of trolleys adapted for congruent movement with said trolley system at spaced positions therewith, a covered silo feeder suspended from each of said trolleys, a feed station portion of said trolley system, means for lifting the cover of a silo feeder approaching said feed station, a feed dispenser at said feed station, said dispenser having a discharge end capable of communication with the open upper end of a silo feeder located at said feed station, electrically operated gate means for controlling the flow of feed through said discharge end of said dispenser and a control means on the overhead trolley at said feed station comprising an electrical circuit, a switch means wired to alternately operate said motor means and said gate means, a first actuator wired to said switch means engageable by a trolley having a hanging feeder approaching said feed station for changing the condition of said switch to shut off flow of current to said motor means and to complete the circuit to said gate means for discharging feed into the open upper end of said silo feeder in register therewith, a second actuator wired to said switch means responsive to a silo feeder receiving feed from said feed dispenser for changing the condition of said switch to shut off flow of current to said gate means and to complete the circuit to said motor means.

5 Claims, 7 Drawing Figures

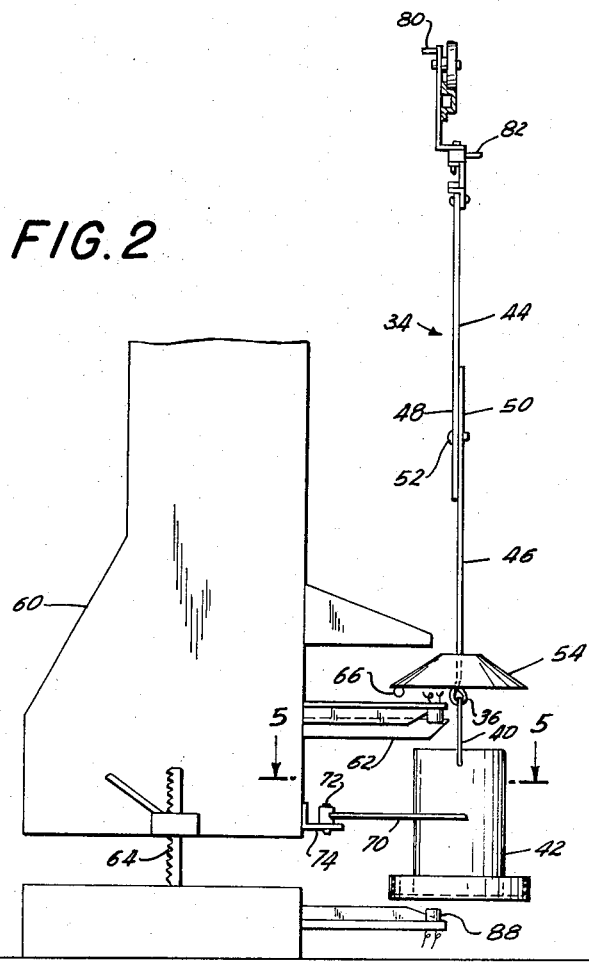
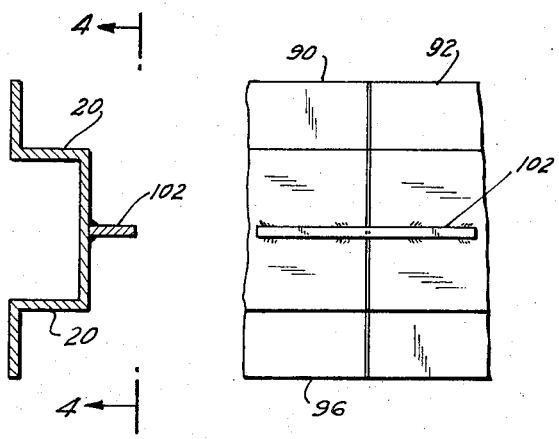
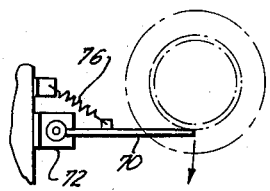

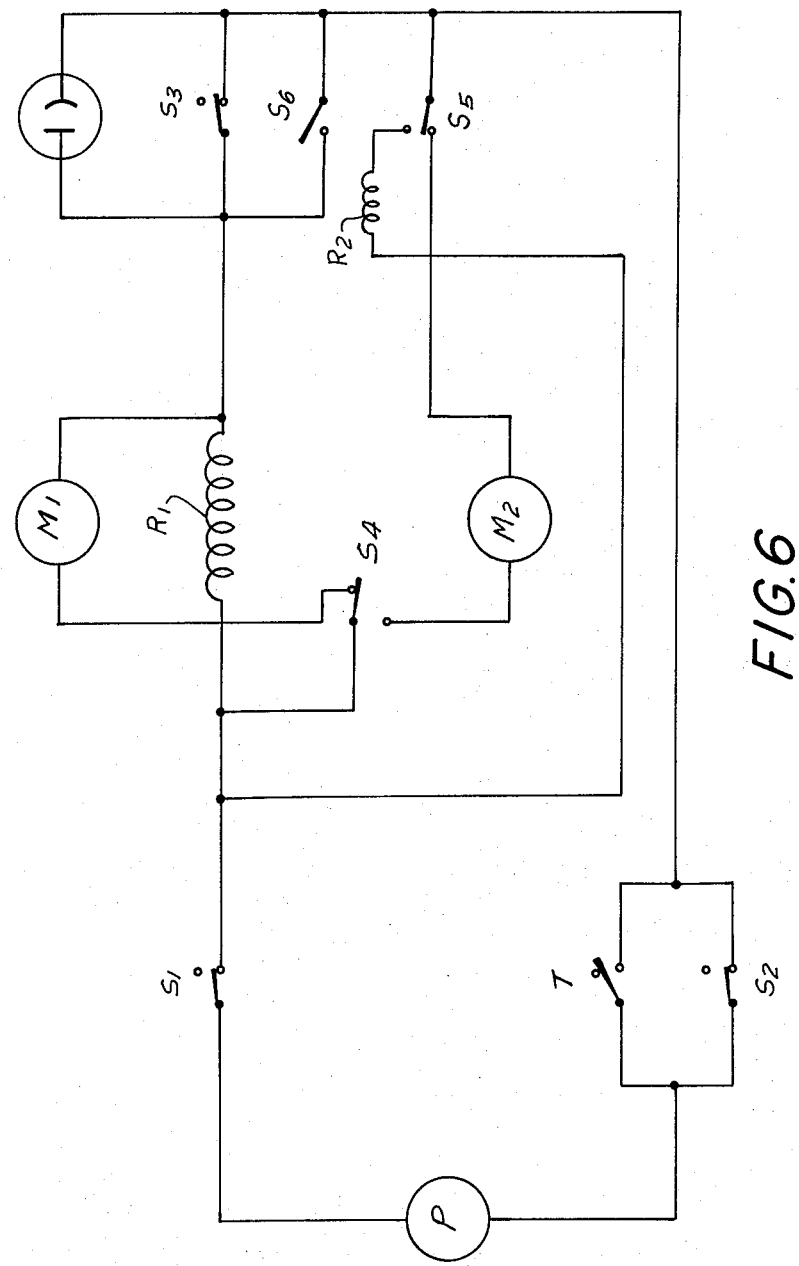

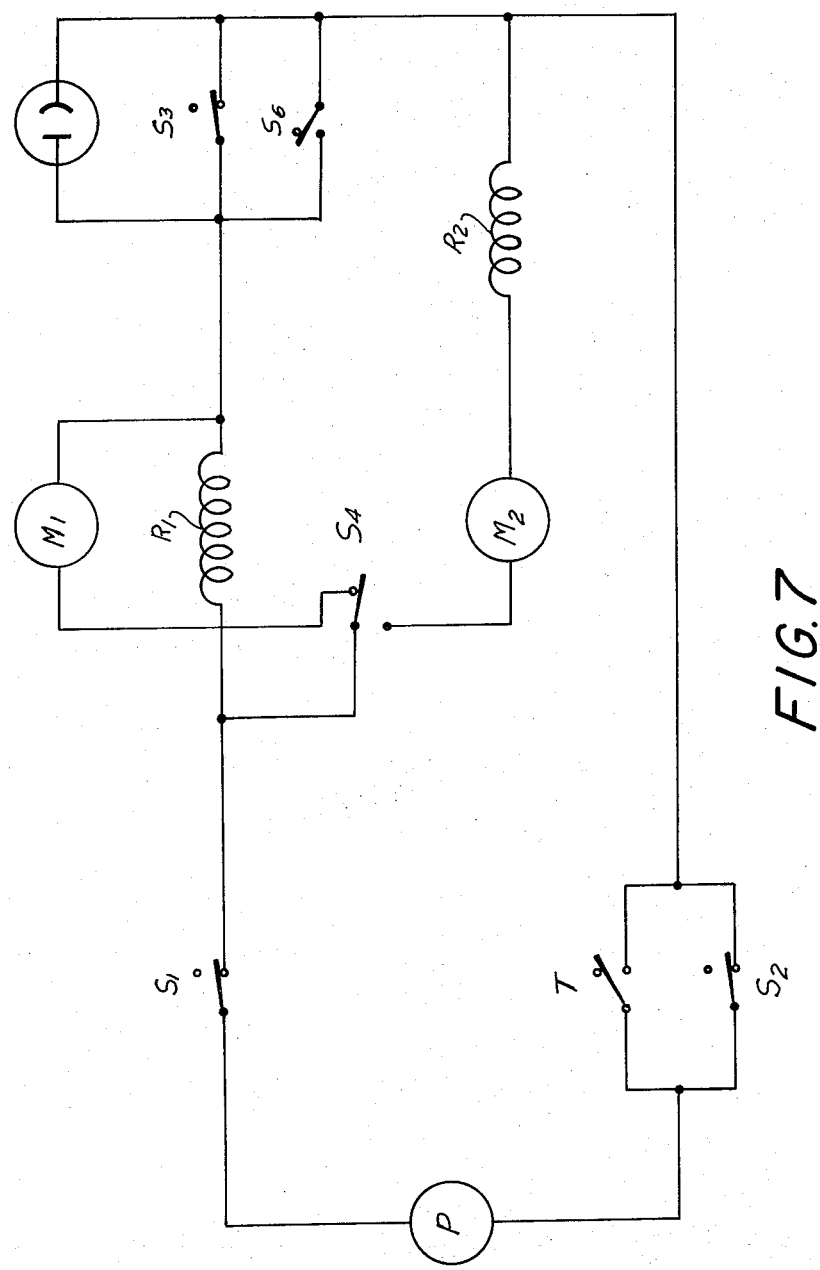

AUTOMATIC POULTRY FEEDING DEVICE

BACKGROUND OF THE INVENTION

This invention relates to an automatic device for feeding poultry and replenishing the feed supply at predetermined times. In particular, it relates to an automatic poultry feeding and refilling device having improved litter reducing capabilities.

Generally the use of automatic feeding and refilling devices used in the raising of poultry has become increasingly popular. A typical system employs an overhead conveyor from which is suspended a plurality of feeding units. The unit is usually located within an enclosure, and especially in those cases where it is used to nourish newly hatched chicks. In operation, the conveyor sequentially moves the feeders into the vicinity of a feed station wherein the feed supply of the individual feeder is replenished. After filling, the feeders are conveyed to pre-determined positions within the enclosure. The cycle is repeated as necessary. Certain advantages are gained by employing an automatic feeding and replenishing system. The system can function at predetermined intervals on a 24-hour period, thereby providing a constant source of feed for the young chickens. Further, the dangers of introducing contamination by external carriers is reduced, as there will be no need for manual refilling of the feeders by potential germ carriers.

Although performing a highly useful function, previous automatic poultry feeders and refillers have been subject to serious defects and deficiencies. Electromechanical switching equipment located at or near the floors of the enclosure and especially near the feed station portion of automatic poultry feeding devices have been subject to breakdowns owing to fouling caused by their undue contact with loose feed. Further, there has been excessive litter buildup in the poultry enclosure at the places where the silo feeders have repeatedly stopped. Feed, accidentally dislodged during the feeding of poultry, has become commingled with animal wastes and the like and formed spaced breeding areas for germs and bacteria. Further, the aforementioned litter mounds have proven difficult to remove during routine maintenance.

Another difficulty posed is the contamination of feed in silo feeders by metal particles and lubricating oils discharged from the overhead conveyor system. The presence of metal particles in the feed can seriously impair the quality of the fryers feeding thereupon. The presence of lubricating oils in the feed promotes balling of the feed and otherwise interferes with the free flow of the feed in the feed silo. Further, certain constituents in the lubricating oil added to stabilize the oil, reduce oxidation, and the like, are harmful to life.

A typical automatic feeder for poultry having the aforementioned defects and deficiencies is disclosed in the U.S. Pat. No. 2,800,106, issued to Clarence E. Nelson. The device employs a turnstile engaged by the silo feeder to stop the conveyor and start the refilling operation. A depressible button located on the floor of the feeding station underneath the silo feeder senses the weight of the feeder, shuts off the dispensing unit and reactivates the conveyor. Since both the depressible button and turnstile are located in close proximity to the feed spout which replenishes each silo feeder, they are subject to de-activation through excess feed build-up on the devices. Should excess grain infiltrate the turnstile and render it inoperable, the device is subject to be locked in an unstable position such that the conveyor will remain in operation continuously, thereby frustrating the refilling operation.

The depressible button located on the floor near the feed station is particularly subject to fouling resulting from excess litter build-up. Should this button fail, an uncontrolled outpouring of feed would result. Attempts to cover the depressible button have proven generally unsatisfactory, since excess droppings, scratchings and other litter build-up on top of conventional covers and render the button inoperable.

The uncovered silo feeders disclosed in Nelson have become contaminated both from animal droppings and from metallic and lubricating oil contaminants from the overhead conveyor system.

Further, the Nelson system has been plagued with recurring areas of litter build-up within the enclosure caused by the inexorable return of the silo feeders to the same resting places after the filling cycle has been completed.

Therefore, there is needed an automatic poultry feeding and refilling device free of the side effects and deficiencies of the prior art.

SUMMARY OF THE INVENTION

It is, therefore, a primary object of this invention to provide an automatic poultry feeding device having a plurality of feeders suspended from an endless conveyor and having means for refilling the feeders at specified intervals and providing a higher degree of reliability in such a system than has been achieved heretofore.

It is another object of this invention to provide an automatic poultry feeding and refilling device having the capability of reducing litter build-up to an extent not achieved by prior art devices.

It is an additional object to provide an automatic poultry feeding device having feeders protected against animal and mechanical contamination.

Accordingly, the above and other objects of the invention are achieved by an automatic poultry feeding device having a driven overhead trolley system having trolleys adapted for congruent movement therewith, said trolleys located at spaced positions thereon. A silo feeder is suspended from each of said trolleys. To replenish the feed supply, a feed station portion of said system is provided. As a silo feeder approaches the feed station, the supporting trolleys engage a first switch mounted on the overhead trolley system. The activation of this switch causes a conveyor motor, which drives the endless chain to which said trolleys are attached, to stop, and also activates a feed-dispensing motor which drives a helical screw positioned in a feed spout for dispensing feed grain to a silo feeder in registry therewith. Multiple screws may also be employed in the spout.

As the feeder is filled up, its increased weight causes a weight-responsive section of the overhead trolley system to yield. At a pre-determined point, a switch located on the overhead conveyor system is actuated by the descending trolley of the silo feeder. The action of this switch de-energizes the feed-dispensing motor. At a predetermined time thereafter the conveyor motor is automatically activated. On occasion, a silo feeder is accidentally disconnected from an overhead trolley. In order to prevent the trolley from deactivating the conveyor motor and activating the feed dispensing motor in the absence of this silo feeder, a photocell detector is provided. The photocell sense the absence of the silo feeder. The photocell is wired to override the command of the trolley-mounted switch, which deactivates the conveyor and activates the feed motor.

To eliminate the possibility of contaminating the feed discharged into the silo feeders with animal and mechanical waster, a cover is provided for the open upper end of the silo feeders. In order to permit an unimpeded grain-filling operation at the feed station and to properly orient the silo feeders for refilling, a combination guide bar—cover lifter is provided at the feed station. The guide bar—cover lifter properly orients the bail attached to the silo feeders and also elevates the cover on the silo feeder during the feed replenishing operation.

A trolley-actuated switch on the overhead trolley system is provided for automatically deactivating the conveyor motor after the last handing feeder has been refilled. The location of this switch is variable horizontally along an overhead trolley beam, so that the resting location of the refilled silo feeders may be altered from time to time in order to prevent the build-up of litter about each resting feeder.

Further objects and advantages will become apparent from the following detailed description which is to be taken in conjunction with the accompanying drawings illustrating a preferred embodiment of this invention, in which:

FIG. 2 is a fragmentary vertical sectional view of the feed station of this invention taken along a plane corresponding to the line 2—2 of FIG. 1;

FIG. 3 is an enlarged vertical sectional view of the weight responsive portion of the overhead trolley system of this invention taken along a plane corresponding to the line 3—3 of FIG. 1;

FIG. 4 is a fragmentary enlarged front elevational view of a weight responsive section of a track on the overhead trolley system taken along a plane corresponding to line 4—4 of FIG. 3;

FIG. 5 is an enlarged horizontal sectional view of a feed station, detailing the feeder stabilization bar, taken along a plane corresponding to line 5—5 of FIG. 2;

FIG. 6 is a schematic circuit diagram showing a control system for the automatic feeding and replenishing system of FIG. 1; and FIG. 7 is a schematic circuit diagram showing an alternate embodiment of a control system for the feeding and replenishing system.

Figure 1:
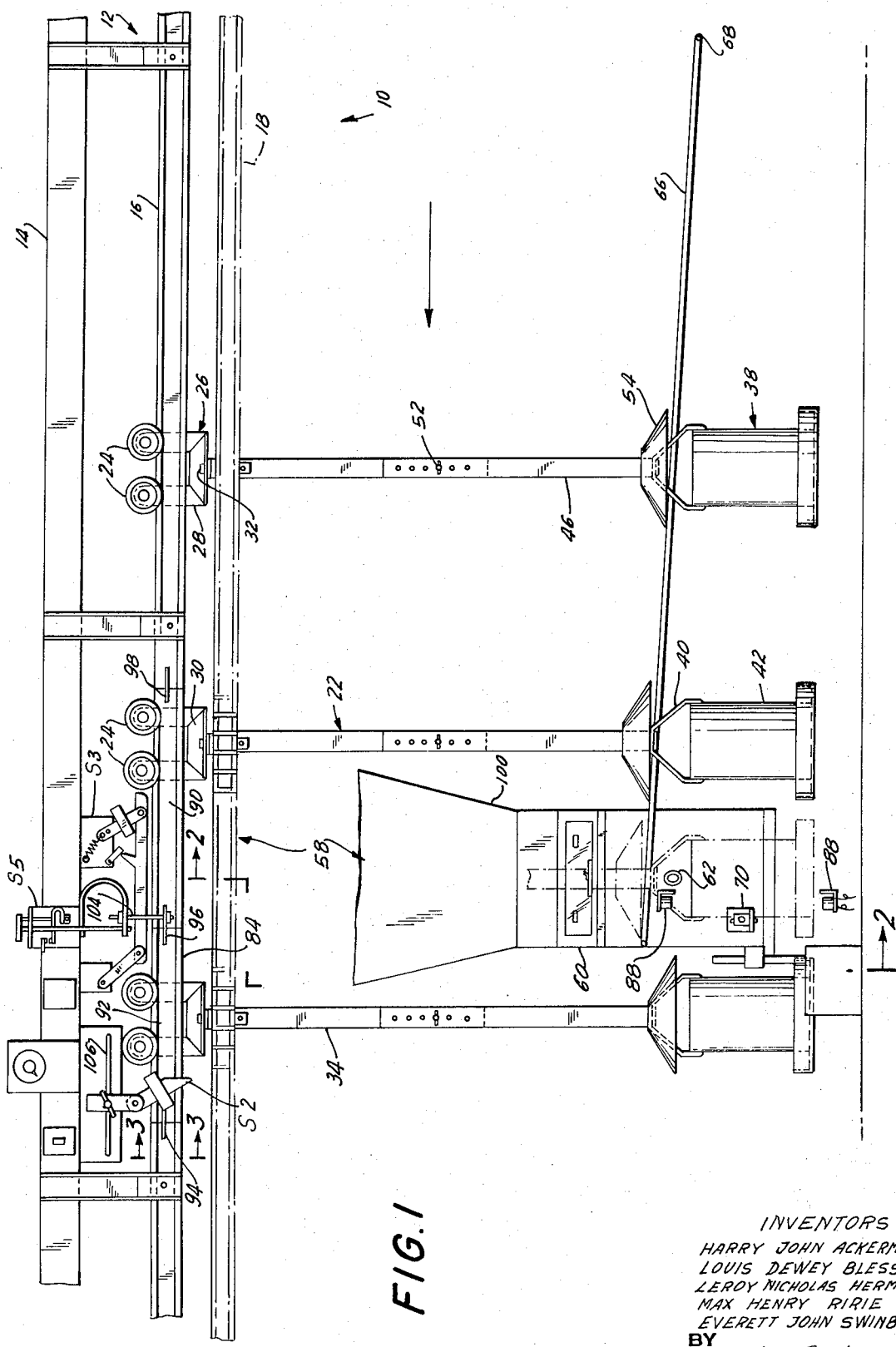
FIG. 1 is a front elevational view, partly in section, of the invention.

The present invention is designed to improve the performance of an automatic feeding and refilling system. In such a feeding and replenishing system 10 an overhead trolley system 12, a fragmentary view of which is seen in FIG. 1, is installed within an enclosure designed to protect newly hatched poultry from a hostile outside environment. An overhead beam 14 is suspended parallel to the ceiling of the enclosure to form an endless support. An overhead track 16 is congruently suspended below overhead beam 14 in order to provide an endless track. As shown in FIG. 3, overhead track 16 has an upper and lower horizontal surface 20.

A plurality of trolleys 22 are adapted for movement along upper surface 20 of overhead track 16. Each trolley has a pair of rollers 24 adapted to ride on surface 20 of overhead track 16.

An endless chain 18 is supported beneath overhead track 16 extending parallel to overhead track 16 for its entire closed circuit. A conveyor motor (not shown) is provided to drive endless chain 18 at a pre-selected speed congruently beneath overhead track 16. Trolleys 22 are propelled along track 16 by endless chain 18. U-shaped support structure 26 has legs 28 affixed to each of said rollers 24. The base portion 30 of the support is affixed to endless chain 18 by tab 32, which projects through an orifice in base 30 of said support and terminates on endless chain 18.

An adjustable hanging strap 34 extends from endless chain 18 beneath each trolley 22. Each strap terminates in a hook 36. A silo feeder 38 is attached to each hook via bail 40, which rests in hook 36.

As is illustrated in FIGS. 1 and 2, strap 34 is adjustable so that the distance between the silo feeder and the floor can be varied. Mating strap portions 44 and 46 have buckling portions 48 and 50 having mating holes. Pin 52 is inserted between adjacent mating holes in order to fix the height of the silo feeder attached below.

Each silo feeder is equipped with a conical feeder cover 54. Each cover has a hole in the top to permit hanging strap 34 to extend therethrough. Conical cover 54 is horizontally stabilized by bail 40.

From the above it is seen that when the endless chain drive motor is energized, endless chain 18 will move in a pre-determined closed circuit at a pre-selected speed. At spaced portions along said endless chain, trolleys 22 will be driven along overhead track 16 via rollers 24. Hanging silo feeders 38 will move congruently beneath the trolleys.

As illustrated in FIG. 1 and 2, poultry feeding device has a feed station portion 58. A feed dispenser 60 is provided thereat, said dispenser being equipped with a feed spout 62 for discharging feed into a chamber 42 of a silo feeder to be refilled. The feed dispenser has a feed hopper 100 for storing chicken feed. At a predetermined time when a silo feeder is stationed at spout 62 of said dispenser, a helical screw (not shown) is adapted to transport feed from said dispenser to said discharge spout 62 of said dispenser. Dispenser 60 is vertically adjustable. As illustrated in FIG. 2, an adjustable elevator (jack) 64 is provided for this purpose.

In order to properly orient bail 40 of hanging feeder 38 as it approaches feed spout 62 such that it does not interfere with the loading of chamber 42, a guidebar 66 is provided. As illustrated in FIG. 1, guidebar 66 is angled upwardly from the point 68 wherein it initially contacts a hanging silo feeder travelling toward feed station 58 and reaches its maximum height at a point adjacent feed spout 62. Guide bar 66 also serves as a cover lifter for covered feeder 38. Cover 54 must be lifted sufficiently above spout 62 so as not to interfere with the introduction of feed into the silo feeding chamber 42.

In order to stabilize a silo feeder during the filling operation at the feed dispenser and in order to dampen the resulting oscillations when a silo feeder is halted at the feed station, feeder bar 70 is provided. As more clearly illustrated in FIGS. 1, 2 and 5, feeder bar 70 is positioned slightly beyond the point at which a silo feeder is stationed during refilling. Feeder bar 70 is fixedly attached to pivot 72. Pivot 72 is rotatably mounted on L-shaped flange 74. L-shaped flanged 74 is fixedly positioned to dispenser 60. Feeder bar 70 is biased by means of spring 76 such that a silo feeder overrunning its stationary point will contact the feeder bar 70 and be urged back towards a stationary position abutting feeder spout 62 by spring 76.

The operation of the feed dispenser is controlled by an electrical circuit having certain key switches operatively associated with the movement of an overhead trolley. As an empty silo feeder approaches the feed dispenser, pin 80 extending transversely from said overhead trolley opens switch S3. The opening of S3 de-energizes the endless-chain drive motor (M1) and permits the feed screw motor (M2) to operate such that feed is discharged into the now halted silo feeder. When the silo feeder is full, weighing switch S5 is actuated closing the circuit to time delay coil R2 and causing the feed screw motor to shut down. Switch S6, responsive to coil R2, is actuated at a predetermined time and thereafter starts the endless-chain drive motor. As the silo feeder begins to move, the rollers of the previously halted trolley move off rocker switch S3 and the switch now automatically closes, keeping the endless-chain motor activated. Weighing switch S5 automatically returned to its normal position as part of the circuit to feed drive motor M2 as the trolley moves on. The change in switch S5 de-energizes coil R2. Switch S6 opens in response to the deactivation of coil R2 to complete the cycle and reset the circuit for another feed filling cycle. The operation is repeated for each of the unfilled silo feeders.

Referring now to FIGS. 1 and 6, the last hanging silo feeder has a pin 82 which is adapted to open normally closed switch S2. When switch S2 is open, both the chain drive and feed motors are de-energized. At a predetermined future time normally open timer (T) momentarily activates the endless-chain motor. As the hanging feeder which had opened switch S2 moves off switch S2, the switch returns to its normally closed position, thereby closing the circuit and keeping the endless-chain motor energized.

If a trolley arrives at the feed station without a hanging feeder attached thereto, photocell detector S6 remains activated and keeps the endless-chain drive motor in operation, thereby preventing the feed motor from depositing feed on the floor of the weighing station enclosure.

Referring now to FIG. 6, the electronic circuit for controlling the operation of the automatic feeder is illustrated. In the illustrated condition the trolley system is in motion. Switch S1 is the main on-off switch for the system. During operation of the system, position switches S1, S2, and S3 are normally closed. Switch S6 is normally open. Switch S5 is normally operatively associated with feed motor (M2).

When relay R1 is activated, the pole of solenoid switch S4 pivots and closes the circuit to the chain drive motor (M1). When relay R1 is deactivated, the pole of solenoid switch S4 pivots to its normal position and completes the circuit to feed motor M2 (as shown in dotted lines).

During initial start-up of the system, main on-off switch S1 is switched to its "on" position. A circuit is thereby closed through relay R1 and switch S3, through power source P and switches S1 and S2. Relay R1 is energized thereby causing solenoid switch S4 to activate the chain drive motor, setting the trolley system in motion. As a hanging feeder approaches the feed station, pin 80 engages switch S3. Switch S3 is mounted from overhead beam 14. Pin 80 engages members of switch 3, thereby causing the switch to open. Relay R1 is thereby deactivated, causing the pole of solenoid switch S4 to pivot to contact the pole connected to feed motor M2, thereby completing a circuit from switch S4 through power source P, through closed switches S1, S5, and S2.

After a pre-determined amount of feed has been deposited in the silo feeder at the feed station, the weight of the now-filled feeder causes a weight-responsive section 84 of overhead track 16 to flex downwardly and permit engagement of weighing switch S5. As switch S5 changes position, a circuit is completed through time delay coil R2. After a predetermined time, dependent upon the characteristics of coil R2, switch S6 operatively associated with coil R2, is actuated, thereby closing the circuit to relay R1. Upon activation of relay R1, the pole of switch S4 pivots to complete the circuit to chain drive motor M1, thereby moving the filled trolley away from the feeding station. As the trolley moves away from the feed station, and from switches S3 and S5, switch S5 returns to its first position and switch S3 returns to its normally closed position, thereby keeping relay R1 and the chain drive motor activated. As switch S5 changes position, coil R2 is deenergized. Switch S6 returns to its normally open position thereby completing the filling cycle. The procedure is repeated for each of the unfilled silo feeders. As the last hanging filled silo feeder leaves the feed station, pin 82 on the overhead trolley engages and opens switch S2, thereby opening the circuit to the chain drive motor. At a pre-selected interval, the timer (T) which is wired to override switch S2, initiates a starting pulse which momentarily energizes relay R1, thereby completing the circuit to the chain drive motor and moving the last-filled trolley off switch S2. Switch S2 then returns to its normally closed position, thus keeping the chain drive motor circuit closed.

As illustrated in FIG. 1, switch 2 is adjustably mounted on the overhead trolley system. By positioning switch S2 at different locations horizontally along its mount 106 the resting position of the fully loaded silo feeders may be varied since the system arrest after S2 is opened. Litter build-up within the chicken-housing portions of the enclosure is thereby reduced. Further, by positioning the electrical circuit and switches associated therewith along the overhead trolley system, the danger of excess litter fouling such switches has been eliminated.

The photocell detecter 88 employed to detect an absent silo feeder is mounted on the down stream side of the feed dispenser parallel to the discharging spout. A transparent dome may be placed over the lower portion of the detector to prevent feed from blocking the element mounted thereunder.

Weighing switch S5 changes position in response to weight of a full silo feeder at the feed dispenser. A weight sensing portion 84 of the overhead track is employed to assist in this function. As illustrated in FIGS. 1, 3, and 4, the weight sensing portion is fabricated by fitting together individual sections 90, 92 of overhead track. As seen particularly in FIG. 4 the discreet portions of overhead track, 90 and 92, are spaced apart by one-sixteenth of an inch to permit flexure and are joined to the fixed track and each other at weldments 94, 96, and 98. A spaced apart plate 102 is welded transversely across each section. The resultant weight responsive section is resilient. When a silo feeder receives feed at the dispenser, the downward force of its overhead rollers causes sections 90 and 92 to pivot downwardly at weldments 94 and 98 respectively. The point of greatest flexure is at weldment 96. As the overhead trolley descends, activating rod 104 on switch S5 is engaged, closing said switch thereby opening the circuit to the feed motor and closing the circuit to the chain drive motor.

This system is designed to be operated sequentially at pre-set times to turn the filling system on, fill each hanging feeder to a pre-determined level and, thereafter, turn itself off. The system is usually operated from one to 10 times every 24 hours.

It should be noted that a detector may be employed to automatically sense the level in feed bin 100. If desired, this detector can be wired to an automatic system for conveying a replenishing feed supply to the bin.

The system will operate, although one or more pans or handing feeders are missing or dropped. In this event, the photocell detector will keep cycling the trolleys until a trolley having a hanging silo feeder arrives at the feed dispenser. The system is adjustable in most respects so as to permit its utilization with fowl of all ages. The food dispenser and cover guide are adjustable to proper heights for the hanging feeders. The feed dispensing device employing the jack or adjustable elevator 64 permits the dispenser to be correspondingly adjusted to the hanging feeders and the cover guide. The weight sensor 104 of switch S5 can be vertically adjusted to a pre-selected level so as to regulate the quantity of feed deposited in each silo feeder.

In an alternate embodiment as illustrated in FIG. 7 a selector switch (not shown) is provided to connect delay coil R2 across weight switch S5 (see FIG. 6). In FIG. 7, the circuit shows a moving trolley system. During filling a circuit is completed through the feed motor M2 and coil R2. After predetermined time switch S6 closes in response to coil R2. A circuit is completed through relay R1, changing the condition of switch S4 thereby causing the feed drive motor to shut down and the track drive motor M1 to operate. The silo feeder moves off track switch S3, thereby closing the switch. The delay coil R2 is deenergized, thereby allowing Switch S6 to return to its normally opened position. The above embodiment allows a fixed amount of feed to flow into a silo feeder. If all feeders are empty then a proper amount of feed is provided for all feeders. If desired, a conveyor system can be provided without the weight responsive section and weight switch employing the above circuit.

I claim:

1. A poultry feeding device comprising:
   a. an overhead trolley system,
   b. motor means for driving said system,
   c. a plurality of trolleys adapted for congruent movement with said trolley system at spaced positions therewith.
   d. a covered silo feeder suspended from each of said trolleys,
   e. a feed station portion of said trolley system,
   f. means for lifting the cover of a silo feeder approaching said feed station portion,
   g. a feed dispenser at said feed station, said dispenser having a discharge end capable of communication with the open upper end of a silo feeder located at said feed station,
   h. electrically operated gate means for controlling the flow of feed through said discharge end of said dispenser,
   i. a control means on said overhead trolley system at the feed station comprising an electrical circuit, a switch means wired to alternately operate said motor means and said gate means, a first actuator wired to said switch means engageable by a trolley having a hanging feeder approaching said feed station for changing the condition of said switch to shut off flow of current to said motor means and to complete the circuit to said gate means for discharging feed into the open upper end of said silo feeder in register therewith, a second actuator wired to said switch means responsive to a silo feeder receiving feed from said feed dispenser for changing the condition of said switch to shut off flow of current to said gate means and to complete the circuit to said motor means.

2. The poultry feeding device of claim 1 and in which a detector is wired to said switch means responsive to the absence of a silo feeder at said feed dispenser for preventing said switch from changing condition when said first actuator is engaged by a trolley in the absence of a silo feeder at said feed station.

3. The invention in accordance with claim 1 in which a third actuator is wired to said switch means, engageable by a pre-selected trolley leaving said feed station to open said electrical circuit thereby shutting off flow of current to said motor means and said gate means.

4. The poultry feeding device of claim 1 in which the means for lifting the cover of said silo feeder comprises a guidebar extending upwardly from a point approaching said feed station and terminating adjacent said feed dispenser, said guidebar positioned congruent to said overhead trolley system at said feed station portion.

5. A poultry feeding device comprising:
   a. an overhead trolley system,
   b. motor means for driving said system,
   c. a plurality of trolleys adapted for congruent movement with said trolley system at spaced positions therewith,
   d. a silo feeder suspended from each of said trolleys,
   e. a feed station portion of said trolley system,
   f. a feed dispenser at said feed station, said dispenser having a discharge end capable of communication with the open upper end of a silo feeder located at said feed station,
   g. means for orienting said silo feeder with respect to said feed dispenser to permit said feed dispenser to freely communicate with the open upper end of said silo feeder, h. electrically operated gate means for controlling the flow of feed through said discharge end of said dispenser, and i. a control means on said overhead trolley system at the feed station comprising an electrical circuit, a switch means wired to alternately operate said motor means and said gate means, a first actuator wired to said switch means engageable by a trolley having a hanging feeder approching said feed station for changing the condition of said switch to shut off flow of current to said motor means and to complete the circuit to said gate means for discharging feed into the open upper end of said silo feeder in register therewith, a second actuator wired to said switch means responsive to a silo feeder receiving feed from said feed dispenser for changing the conditions of said switch to shut off flow of current to said gate means and to complete the circuit to said motor means.

* * * * *